United States Patent Office 3,497,564
Patented Feb. 24, 1970

3,497,564
OXIDATIVE DEHYDROGENATION OF ALKYLBENZENES
Robert H. Allen, Turner Alfrey, Jr., and Larry D. Yats, Midland, Mich., assignors to The Dow Chemical Company, Midland, Mich., a corporation of Delaware
No Drawing. Continuation-in-part of application Ser. No. 476,711, Aug. 2, 1965. This application Aug. 28, 1967, Ser. No. 663,530
Int. Cl. C07c 25/28, 15/00
U.S. Cl. 260—650                        10 Claims

ABSTRACT OF THE DISCLOSURE

Ethylbenzene, isopropylbenzene, and their ring monoalkylated and monohalogenated derivatives are oxidatively dehydrogenated to the corresponding styrene when contacted with an oxygen-containing gas at elevated temperature in the presence of a carbon surface. Suitable conditions include a ratio of 0.1–4 moles of oxygen in an inert gas-oxygen mixture per mole of ethylbenzene and a reaction temperature of 400–700° C.

CROSS REFERENCE TO RELATED APPLICATION

This application is a continuation-in-part of our copending application Ser. No. 476,711, filed Aug. 2, 1965, now abandoned.

BACKGROUND OF THE INVENTION

This invention relates to a new process whereby alkylbenzenes and alkylhalobenzenes are dehydrogenated to the corresponding styrenes in the presence of free oxygen and a carbon catalyst.

Styrene and substituted styrene are made in large quantities by passing a vaporized ethylbenzene admixed with steam over a dehydrogenation catalyst in the absence of free oxygen at elevated temperatures in the approximate range of 550–650° C. The high reactor temperature and the volume of steam used are among the disadvantages of this method. Most such catalysts need at least occasional treatment with air to burn off carbonaceous deposits and thereby restore the activity of the catalyst.

Various hydrocarbons have been successfully dehydrogenated with different catalysts in the additional presence of molecular oxygen. Activated carbon has been used as the catalyst in such oxidative dehydrogenation processes for the conversion of lower alkanes to the corresponding alkenes. Such a process is described in German Patent 817,304. However, the temperatures employed in this process are very high while the hydrocarbon conversion remains relatively modest. A similar process employing steam as a feed diluent is described by Gosselin et al., U.S. 3,113,984 as providing very low hydrocarbon conversions.

The dehydrogenation of ethylbenzene to make styrene resembles the dehydrogenation of monoolefins to diolefins more closely than the conversion of an alkane to an alkene. For example, catalysts and process conditions suitable for dehydrogenating butene to butadiene are usually also suitable for converting ethylbenzene to styrene. On the other hand, catalysts and process conditions which are favorable for dehydrogenating butane to butene are usually not suitable for dehydrogenating ethylbenzene to styrene.

Styrene has been produced by the dehydrogenation of ethylbenzene over carbon at about 600° C. in the absence of oxygen. However, when ethylbenzene is contacted with oxygen at high temperatures, even though some styrene may be formed, oxygenated compounds such as acetophenone and benzaldehyde are normally found also to be major products of the reaction. Characteristic results of such a procedure are described by Jones et al., J. Chem. Eng. Data, 6, 623–626 (1961). There is no reason to expect from the prior art, therefore, that good yields of styrene substantially free of oxygenated byproducts would be obtainable by contacting a mixture of oxygen and ethylbenzene vapor with a carbon surface, particularly at relatively moderate temperatures.

SUMMARY OF THE INVENTION

It has now been found that ethylbenzene and substituted ethylbenzenes can be oxidatively dehydrogenated to the corresponding styrene in high yield without significant production of oxygenated aromatics by passing a mixture of the vaporized ethylbenzene with oxygen-inert gas mixture containing not more than fifty percent by volume of oxygen over carbon at 400–700° C., preferably at 500–650° C. The composition of the hydrocarbon-gas mixture is adjusted so that 0.1–4 moles of oxygen are present per mole of the ethylbenzene.

The ethylbenzenes to which the present process is applicable are represented by the structural formula:

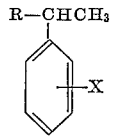

wherein R is hydrogen or methyl and X is hydrogen, alkyl of 1–4 carbon atoms or halogen of atomic number 9–35, i.e., fluorine, chlorine or bromine. The product of the process is the corresponding styrene which has the formula:

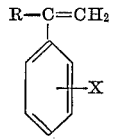

When X is an alkyl group which can be dehydrogenated, for example, in the case of diethylbenzene, the principal dehydrogenated product obtained is the alkylstyrene, in this instance, ethylstyrene. Some of the further dehydrogenated product, divinylbenzene, may also be formed.

Surprisingly, the present process appears to be specific for the dehydrogenation of an ethylbenzene as described above and it is ineffective for converting butene to butadiene, even though these two reactions generally take place under very similar process conditions as previously discussed.

DETAILED DESCRIPTION

Preferably, oxygen is supplied to the reaction as a mixture with an inert gas such as nitrogen containing 10–50 percent by volume of oxygen. Carbon dioxide, argon and helium are other suitable inert diluents. Ordinarily, the oxygen containing gas is air. Steam can also be used as an inert diluent but its use confers no particular advantage. Best results are obtained when the feed mixture contains 0.5–1.5 moles of oxygen as air per mole of ethylbenzene.

The carbon catalyst can be any amorphous or graphitic carbon, either on a mineral support or in bulk form. Activated carbon of whatever origin is operable although this type of material is usually easily oxidized and it tends to be consumed during the reaction, forming hot spots of excessively high temperature in the catalyst bed. Less active forms of carbon such as natural or synthetic graphite withstand oxidation relatively well under process conditions and are effective catalysts. Other forms of carbon such as coke may also be used.

A particularly effective catalyst is obtained by depositing pyrolytic carbon in the presence of free oxygen upon an inorganic support having a relatively high ratio of surface area to weight. Supports having a surface area of 5–750 square meters per gram and an average pore diameter of at least about 20 angstroms are suitable and silica gels and alumina gels having such characteristics are preferred. Silicates such as aluminum silicates, zeolites, porous glass, and the like can also be used as supports. Preferred supports have a surface area of 100–500 square meters per gram and an average pore size of at least 40 angstroms. Pores in such supports of less than 40 angstroms diameter and particularly pores of less than 20 angstroms appear to be subject to plugging by deposited carbon with consequent loss of catalyst efficiency.

Pyrolytic carbon is effectively formed on such a support by thermally decomposing a vaporized hydrocarbon in contact with the support at about 300–600° C. Uniformly good results are obtained when the support is either pretreated with air or other oxygen-containing gas at these temperatures or when the pyrolytic carbon surface is formed in the presence of oxygen. This is conveniently done by passing an air-ethylbenzene feed mixture over the support at or slightly below the normal process temperature. Such supported catalysts have the advantage of being capable of reactivation or reformation, if necessary, by burning off part or all of the carbon when it has lost some of its activity after continued use. The carbon surface can then be re-established as described above.

Optimum ethylbenzene space velocities vary somewhat according to the dimensions of the catalyst bed, the activity of the catalyst, the reaction temperature and other process conditions. In general, ethylbenzene space velocities of about 5–500 are suitable, space velocities in the range of 10–100 being preferred. Space velocities cited are calculated as volumes of gaseous ethylbenzene at standard conditions (0° C.; 760 mm.) per volume of catalyst bed per hour.

EXAMPLE 1

The reactor was a borosilicate glass tube of one inch inside diameter and 27 inches long, vertically disposed within a ceramic core of about the same length which was wound with resistance wire and covered by suitable insulation. The windings on this heating element were divided into three separately controlled sections covering the top, middle, and bottom sections of the reactor tube. Thermocouples were taped to the ouside of the reactor tube in appropriate locations for reading and control of reactor temperature. Other thermocouples in wells within the reactor tube supplied readings of temperatures at various points within the reactor tube. It was found later in experiments using a reactor equipped for more accurate temperature measurement (Examples 18–21), that the actual temperatures within the catalyst bed during dehydrogenaiton ran as much as 100–150° C. higher than the temperature measured on the outside of the reactor tube. In other words, a reactor temperature of 300–450° C. was sufficient to initiate the dehydrogenation reaction which then continued at a significantly higher catalyst temperature usually about 500–650° C. Inlet tubes connected to the top of the reactor tube admitted air or other oxygen-containing gas and liquid alkyl-aromatic feed, the top section of the reactor serving as a vaporizer and preheat section. Portions of the reactor tube not occupied by the catalyst bed were filled with glass wool. The effluent from the bottom of the reactor passed successively through a water-cooled condenser, a receiver flask, and a cold trap cooled by solid carbon dioxide. Non-condensable gases flowing from the cold trap were measured and analyzed as desired.

The reactor tube was loaded with 114 g. of 12–20 mesh synthetic graphite. With the reactor temperature at 450° C., liquid ethylbenzene at 17 ml./hr. and air at 360 ml./min. were introduced into the top of the reactor tube. This corresponds to a molar ratio of oxygen to hydrocarbon of about 1.3/1. During the first 48 hours, the proportion of styrene in the organic layer condensed in the receiver flask increased gradually to about 40 percent by weight and thereafter remained at about this level. After 165 hours, this proportion was 35–40 percent. During the run, the non-condensable gases consisted essentially of nitrogen and carbon dioxide with a small amount of carbon monoxide. Little or no free oxygen was present. Condensed styrene and unreacted ethylbenzene accounted for better than 85 percent by weight of the total ethylbenzene feed. The condensate in the receiver flask was essentially water, ethylbenzene and styrene and contained no significant quantity of oxygenated aromatic compounds. At the end of the run, the carbon catalyst had lost less than one percent of its original weight.

EXAMPLE 2

The reactor of Example 1 was charged with a catalyst bed consisting of 12.8 g. of powdered activated carbon supported on glass wool. At the air and ethylbenzene feed rates of Example 1, the condensed organic material in the receiver flask contained 26.3 percent styrene at a reactor temperature of 300° C. and 40.0 percent styrene at a reactor temperature of 350° C. Practically complete utilization of oxygen and substantially no production of oxygenated aromatics were noted as before. Recovered organic condensate represented 85–90 percent by weight of the ethylbenzene feed.

EXAMPLE 3

Using a procedure similar to that of Example 1, a mixture of 360 ml./min. of air and 17.7 g./hr. of 1-chloro-4-ethylbenzene was passed over 11 g. of powdered graphite maintained in place by a glass wool packing at a reactor temperature of 490° C. The organic condensate in the receiver flask accounted for about 90 percent of the chloroethylbenzene feed and contained 40 percent by weight of p-chlorostyrene, the remainder being unreacted 1-chloro-4-ethylbenzene.

EXAMPLE 4

The reactor describe above was charged with 71 g. of 3–8 mesh silica gel having a surface area of 340 square meters per gram and an average pore diameter of about 140 angstrom units which made an 18 inch bed in the reactor tube. The temperature of the reactor was adjusted to 350° C. and a mixture of 14.7 g./hr of ethylbenzene and 360 ml./min. of air was passed over the silica gel at that reactor temperature for 24 hours. The conversion of ethylbenzene was low but there was sufficient carbonization to render the silica gel light brown and opaque. The reactor temperature was then raised to 450° C. Under these conditions, 45 percent of the ethylbenzene feed was converted to styrene. This rate of conversion continued without significant change for 96 hours. The condensed organic product amounted to about 80–85 percent of the weight of ethylbenzene feed. It contained only traces of oxygenated products.

EXAMPLE 5

The procedure of Example 4 was repeated using a four inch catalyst bed of the same kind of silica gel coated with pyrolytic carbon as shown in that example. The styrene content of the organic product remained constant at 42–45 percent for nine days of continuous operation. The air stream was then diuted with argon to obtain the following results:

| Argon ml./min. | Residence time, sec. | Organic product, percent styrene |
| --- | --- | --- |
| 0 | 10 | 42 |
| 180 | 7 | 42 |
| 360 | 5 | 43 |

The recovery of condensed organics was similar to that of Example 4. Essentially no oxygenated compounds were produced.

EXAMPLE 6

A four inch bed of silica gel of the kind used in Example 4 was treated at 350° C. with a stream of 14.7 g./hr. of ethylbenzene plus 360 ml./min. of air for 20 hours. The reactor temperature was then increased to 450° C. and the run was continued under these conditions until product analysis indicated that a steady state had been established. To determine the effect of lower oxygen/ethylbenzene ratios, the ethylbenzene feed rate was increased while the air feed was held constant. In each case, the conditions were maintained until the conversion of ethylbenzene was reestablished at a constant level.

| Ethylbenzene, ml./hr. | Mole ratio $O_2$/ ethylbenzene | Wt. percent styrene in condensed organics | Percent* yield styrene |
|---|---|---|---|
| 17.2 | 1.3 | 47 | 76 |
| 69 | 0.33 | 19 | 87 |
| 138.9 | 0.163 | 12 | 91 |

*Theoretical, calculated from styrene content of product.

EXAMPLE 7

The method by which an active supported pyrolytic carbon surface is established can be varied, but it is usually desirable to pretreat the inorganic support with air or with air plus a hydrocarbon at a reactor temperature below the normal process temperature, i.e., below about 425° C., preferably at 300–400° C.

A four inch bed of granular silica gel of the kind used in Example 4 was treated at 350° C. with air alone at 360 ml./min. for about 20 hours. The reactor temperature was then increased to 450° C. and ethylbenzene at 14.7 g./hr. was added to the air feed. The conversion of ethylbenzene to styrene gradually increased to about 45 percent at which level it remained relatively steady for several days' running.

When the above procedure was repeated omitting the pretreatment with air and starting the air-ethylbenzene feed stream over the bed of silica gel at the same reactor temperature, results were erratic and yields of styrene were often low.

EXAMPLE 8

A silica gel bed such as described in Example 4 was treated with ethylbenzene and air at 350° C. as described in that example to establish a pyrolytic carbon surface. The reactor temperature was then raised to 450° C. and 360 ml./min. of air and 17.9 g./hr. of 1-chloro-2-ethylbenzene was started through the catalyst bed. Analysis of the effluent product showed that 44 percent of the 1-chloro-2-ethylbenzene feed was being converted to o-chlorostyrene with the condensed organic products representing about 85–90 percent of the weight of 1-chloro-2-ethylbenzene feed. The condensate was essentially a mixture of o-chlorostyrene and 1-chloro-2-ethylbenzene.

When this experiment was repeated using 1-chloro-4-ethylbenzene as the feed, similar results were obtained, the converted product being essentially p-chlorostyrene.

EXAMPLE 9

The procedure of Example 8 was repeated using 1-tert-butyl-4-ethylbenzene as the feed. At a reactor temperature of 450° C., about 38 percent of the butylethylbenzene was converted to p-tert-butylstyrene. There were no significant amounts of dealkylated or oxygenated products in the condensed effluent.

EXAMPLE 10

A sample of silica gel of the type used in Examples 4–9 was washed with seven portions of 10 percent hydrochloric acid and several portions of distilled water to remove iron. The washed and dried gel was loaded into the reactor to make an 18 inch bed and it was pretreated with ethylbenzene and air at 350° C. to establish a carbon surface.

Ethylbenzene and air at 14.7 g./hr. and 360 ml./min., respectively, were then passed over the catalyst at a reactor tube temperature of 450° C. to obtain a condensed hydrocarbon product containing 55 percent by weight of styrene. After 12 days of continuous operation under these conditions, the conversion to styrene had decreased to about half its original level. The hydrocarbon and air feed streams were then shut off and 50–70 ml./min. of oxygen was passed through the catalyst bed for 20 hours at a reactor temperature of 450° C. to burn off the accumulated carbon. When the ethylbenzene and air feeds were restored and a pyrolytic carbon surface had been reestablished, the condensed hydrocarbon product was found to contain 45 percent by weight of styrene.

EXAMPLE 11

When the procedure of Example 4 was repeated using a similarly carbonized four inch bed of a silica gel having a surface area of 500 square meters per gram and an average pore diameter of 25 angstroms, relatively high conversion of ethylbenzene to styrene was obtained initially, the condensed organic effluent containing about 45 percent styrene. However, the conversion declined to about half its original level after about 24 hours of running.

EXAMPLE 12

The reactor of Example 1 was charged with granular gamma alumina to make a four inch bed. This material had a surface area of 200 square meters per gram and an average pore diameter of 50 angstroms. The reactor was heated to 350° C. and a mixture of 360 ml./min. of air and 14.7 g./hr. of vaporized ethylbenzene was passed over the bed of alumina, thereby forming pyrolytic carbon on the alumina. After an initial induction period, about 30 percent of the ethylbenzene was converted to styrene with little or no production of oxygenated compounds.

EXAMPLE 13

Granules of porous fritted glass formed a four inch bed in the reactor. The porous glass had a surface area of 200 square meters per gram and an average pore diameter of 40 angstroms. The reactor was heated to 350° C. and air was passed through the bed for 24 hours. The reactor tube temperature was then raised to 450° C. and a mixture of air and ethylbenzene vapor as in Example 10 was passed through the bed. The conversion of ethylbenzene to styrene rose initially to about 40 percent as a pyrolytic carbon surface was established. The liquid organic recovery was about 90 percent. The used porous glass was similar in appearance to used silica gel catalysts.

EXAMPLE 14

Example 12 was repeated using a four inch bed of an aluminum silicate molecular sieve having a surface area of 563 square meters per gram and an average pore diameter of about 10 angstroms. This material, after formation of a carbon surface as in that example, provided a constant conversion of ethylbenzene to styrene of about 23 percent over about 500 hours of operation. No significant quantity of oxygenated compounds were found in the liquid organic condensate which represented about 90 percent of the weight of ethylbenzene feed. The used support was found to have a considerably reduced surface area.

EXAMPLE 15

The reactor of Example 1 was charged with granular (about 10 mesh) anhydrous $CaSO_4$ to make an eighteen inch bed. This support had an average surface area of 9 square meters per gram. It was pretreated with 360 ml./min. of air at 350° for several hours, then 14.7 g./hr. of ethylbenzene was added to the air feed to establish a carbon surface. Upon running under these conditions, the conversion of ethylbenzene to styrene rose to a maximum of only about 3.5 percent. Raising the reactor temperature to 450° C. increased the conversion initially to 27 percent but the catalyst rapidly lost activity.

EXAMPLE 16

In a comparative experiment using the reactor of Example 1, a mixture of 71 ml./min. of propane and 360 ml./min. of air was passed over 8.5 g. of powdered graphite on glass wool at a reactor tube temperature of 420°–430° C. The only significant reaction observed was the combustion of a minor part of the propane to make carbon dioxide.

EXAMPLE 17

Similarly, a mixture of 72 ml./min. of butene-1 and 360 ml./min. of air was passed over 11 g. of powdered graphite at a reactor tube temperature of 450°–490° C. Very little butadiene was found in the effluent gas, the main reaction being the combustion of 3–7 percent of the butene feed.

EXAMPLES 18–21

A reactor was set up as described in Example 1 except that maximum catalyst temperatures were precisely measured by several spaced thermocouples within a ³⁄₁₆ inch O.D. concentric thermowell extending axially through the catalyst bed. Four inch beds of several different silica and alumina gels were precarbonized as described in Example 4. The reactor temperature was then adjusted as noted and a mixture of vaporized ethylbenzene at 14.7 g./hr. and air sufficient to provide one mole of oxygen per mole of ethylbenzene was passed through the catalyst bed for several hours. The condensable effluent product was collected and analyzed as previously described. Organic condensate recoveries were of the order of 85 percent of the ethylbenzene feed as before.

| Example | Gel | Time, hrs. | Temperature, °C. Reactor | Temperature, °C. Catalyst max. | Wt. percent styrene in condensate |
|---------|-----|------------|--------------------------|--------------------------------|-----------------------------------|
| 18      | A   | 4          | 450                      | 620                            | 52                                |
|         |     | 71         | 450                      | 633                            | 40.1                              |
| 19      | B   | 3          | 500                      | 588                            | 37.1                              |
|         |     | 26         | 500                      | 607                            | 31.8                              |
| 20      | C   | 4          | 450                      | 630                            | 53.6                              |
|         |     | 144        | 450                      | 637                            | 44.7                              |
| 21      | D   | 48         | 350                      | 586                            | 22                                |
|         |     | 51         | 450                      | 635                            | 29.1                              |

Description of gels: A—silica gel, 3–8 mesh, surface area approx. 340 sq. m./g., average pore diameter 140 A.; B—silica gel, 3–8 mesh, surface area approx. 800 sq. m./g., average pore diameter 22 A.; C—silica gel, 3–8 mesh, surface area approx. 575 sq. m./g., average pore diameter 54 A.; D—alumina gel, 14–28 mesh, surface area approx. 220 sq. m./g., average pore diameter 58 A.

Using carbon catalysts and reaction conditions such as shown in the above examples, other ethylbenzenes of the class defined are similarly converted to the corresponding styrenes. For example, by this process ethylfluorobenzene is converted to fluorostyrene, ethylbromobenzene is converted to bromostyrene, ethyltoluene is dehydrogenated to vinyltoluene, isopropylbenzene is dehydrogenated to α-methylstyrene and diethylbenzene is converted to ethylstyrene.

In contrast to the results shown above where carbon on a siliceous or alumina support was the catalyst, similar experiments using supports such as silicon carbide, silica sand, and fused or sintered alumina, tabular alumina, and mullite, all of which had surface areas less than one square meter per gram gave almost completely negative results with little or no styrene produced.

We claim:
1. A process for oxidatively dehydrogenating to the corresponding styrene an alkylbenzene of the formula:

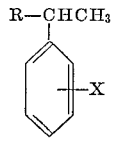

wherein R is selected from the group consisting of a hydrogen atom and a methyl radical and X is selected from the group consisting of a hydrogen atom, an alkyl radical of 1–4 carbon atoms and a halogen atom of 9–35 atomic number, which process comprises contacting a mole of said alkylbenzene in the gaseous state with 0.1–4 moles of oxygen as contained in an oxygen-inert gas mixture of not more than 50 percent by volume of oxygen at a temperature of 400–700° C. and in the presence of carbon as catalyst, which carbon is selected from the group consisting of activated carbon, graphite, and supported pyrolytic carbon wherein the support is an inorganic solid selected from the group consisting of silica gel, alumina, an aluminum silicate zeolite, and porous glass, which solid has a surface area of 5–750 sq. meters per gram and an average pore diameter of at least 20 angstroms.

2. The process of claim 1 wherein the alkylbenzene is ethylbenzene.
3. The process of claim 1 wherein the alkylbenzene is 1-chloro-4-ethylbenzene.
4. The process of claim 1, wherein the alkylbenzene is 1-chloro-2-ethylbenzene.
5. The process of claim 1 wheerin the alkylbenzene is 1-tert-butyl-4-ethylbenzene.
6. The process of claim 1 wherein the alkylbenzene is isopropylbenzene.
7. The process of claim 1 wherein the catalyst is pyrolytic carbon on an inorganic support selected from the group consisting of silica gel, alumina, and aluminum silicate, zeolite, and porous glass, which support has a surface area of 5–750 sq. meters per gram and an average pore diameter of at least 20 angstroms.
8. The process of claim 7 wherein the inorganic support is alumina.
9. The process of claim 7 wherein the inorganic support is silica gel.
10. The process of claim 9 wherein a mole of ethylbenzene is contacted at 500–650° C. with 0.5–1.5 moles of oxygen as contained in air in the presence of pyrolytic carbon on silica gel having a surface area of 100–500 sq. meters per gram and an average pore diameter of at least 40 angstroms.

References Cited

UNITED STATES PATENTS 2,110,833  3/1938  Mark et al. _____ 260—669 XR
3,113,984  12/1963  Gusselin et al. _____ 260—677

FOREIGN PATENTS 817,304  8/1951  Germany.

OTHER REFERENCES

Jones et al. I, Ind. and Eng. Chem., vol. 51, pp. 262–266, 1959.

Jones et al. II, Jour. of Chem. & Eng. Data, vol. 6 (1961) pp. 623–626.

LEON ZITVER, Primary Examiner

HOWARD T. MARS, Assistant Examiner

U.S. Cl. X.R.

252—444, 446, 447, 455; 260—669, 677, 680